(12) United States Patent
Sapija et al.

(10) Patent No.: US 10,730,632 B2
(45) Date of Patent: Aug. 4, 2020

(54) AIRCRAFT

(71) Applicant: Goodrich Corporation, Charlotte, NC (US)

(72) Inventors: Dariusz Sapija, Jelcz-Laskowice (PL); Sebastian Szymański, Wrocław (PL)

(73) Assignee: GOODRICH CORPORATION, Charlotte, NC (US)

( * ) Notice: Subject to any disclaimer, the term of this patent is extended or adjusted under 35 U.S.C. 154(b) by 295 days.

(21) Appl. No.: 15/837,139

(22) Filed: Dec. 11, 2017

(65) Prior Publication Data

US 2018/0170558 A1 Jun. 21, 2018

(30) Foreign Application Priority Data

Dec. 16, 2016 (EP) ..................... 16461576

(51) Int. Cl.
| | | |
|---|---|---|
| *B64D 25/12* | (2006.01) | |
| *B64C 1/32* | (2006.01) | |
| *B64D 25/08* | (2006.01) | |
| *B64D 45/00* | (2006.01) | |

(52) U.S. Cl.
CPC ............... *B64D 25/12* (2013.01); *B64C 1/32* (2013.01); *B64D 25/08* (2013.01); *B64D 45/00* (2013.01); *B64D 2045/0085* (2013.01)

(58) Field of Classification Search
CPC .... B64D 25/08; B64D 25/12; B64D 45/0015; B64C 1/32
See application file for complete search history.

(56) References Cited

U.S. PATENT DOCUMENTS

| | | | | |
|---|---|---|---|---|
| 3,880,387 | A * | 4/1975 | Martin, Jr. ................ | B64C 1/32 244/121 |
| 6,213,427 | B1 | 4/2001 | Mareska | |
| 6,382,563 | B1* | 5/2002 | Chiu ...................... | B64D 25/12 244/120 |
| 2011/0233341 | A1* | 9/2011 | Monteforte ............ | B64D 25/12 244/140 |
| 2016/0137301 | A1* | 5/2016 | Jackson ............. | B64D 11/0602 244/118.6 |

OTHER PUBLICATIONS

Partial European Search Report for International Application No. 16461576.7 dated Jun. 20, 2017, 18 pages.

\* cited by examiner

*Primary Examiner* — Nicholas McFall
(74) *Attorney, Agent, or Firm* — Cantor Colburn LLP

(57) ABSTRACT

The present disclosure relates to an aircraft comprising a passenger module, and also a method of protecting a passenger on an aircraft. The passenger module is configured to be ejected through a skin of the aircraft in response to an ejection command. The ejection command may be given in response to a fatal condition to the aircraft being detected or manually indicated.

14 Claims, 5 Drawing Sheets

AIRCRAFT

FOREIGN PRIORITY

This application claims priority to European Patent Application No. 16461576.7 filed Dec. 16, 2016, the entire contents of which is incorporated herein by reference.

TECHNICAL FIELD

The present disclosure relates to aircraft, and to a method of protecting a passenger on an aircraft.

BACKGROUND

Current passenger aircraft designs do not provide evacuation systems for passengers in the event of a fatal condition to the aircraft being encountered during flight. Thus, if such a condition occurs, the aircraft will normally crash to the ground or ocean over which it is flying with the passengers still on board. This can lead to substantial loss of life.

Due to the large size of passenger aircrafts and the relatively large number of passengers, it is not possible to use evacuation solutions known from military or lightweight aircrafts, such as personal parachutes, ejection seats or airplane parachutes.

SUMMARY

Disclosed herein is an aircraft. The aircraft comprises a skin surrounding a cabin of the aircraft. A passenger module is positioned within the skin. The aircraft further comprises an ejector for ejecting the passenger module through the skin in response to an ejection command issued by a controller.

In an embodiment of the above aircraft, the controller is configured to issue the ejection command in response to a fatal condition to the aircraft being sensed or in response to a manual input.

In a further embodiment of any of the above aircraft, the passenger module further comprises at least one cutting element configured to aid penetration of the passenger module through the skin of the aircraft during ejection of the passenger module.

In a further embodiment of any of the above aircraft, the passenger module is further hermetically sealable from the cabin in response to a sealing command issued by the controller. Additionally, the controller is configured to issue the sealing command in response to a hazardous or fatal condition to the aircraft being sensed or in response to a manual input.

Also disclosed herein is an aircraft which comprises a passenger module positioned within a cabin of the aircraft. The passenger module is hermetically sealable from the cabin in response to a sealing command issued by a controller in response to a hazardous condition to the aircraft being sensed or in response to a manual input.

In an embodiment of the above aircraft, the aircraft further comprises an ejector for ejecting the passenger module from the aircraft in response to a subsequent fatal condition to the aircraft being sensed or a subsequent manual input.

In a further embodiment of any of the above aircraft, the passenger module further comprises at least one window. Additionally, the at least one window of the passenger module may be aligned with a window in the skin of the aircraft.

In a further embodiment of any of the above aircraft, the aircraft further comprises a plurality of passenger modules.

Additionally, the cabin may further comprise a central aisle, and a pair of passenger modules may be positioned on opposing sides of the central aisle and spaced apart thereby.

Also disclosed herein is a method of protecting a passenger on an aircraft. The method comprises providing a passenger module within a cabin of the aircraft, and ejecting the module through a skin of the aircraft in a fatal condition to the aircraft.

In an embodiment of the above method, the fatal condition to the aircraft is sensed or in response to a manual input.

In a further embodiment of any of the above methods, the method further comprises sealing the passenger module from the cabin in a hazardous condition to the aircraft.

Also disclosed herein is another method of protecting a passenger on an aircraft. The method comprises providing a passenger module within a cabin of the aircraft, and sealing the passenger module from the cabin in a hazardous condition to the aircraft.

In an embodiment of the above method, the method further comprises subsequently ejecting the passenger module from the aircraft.

BRIEF DESCRIPTION OF THE DRAWINGS

Some exemplary embodiments of the present disclosure will now be described by way of example only, and with reference to the following drawings in which:

FIG. 2c shows a cross-section through the passenger module of FIG. 2a.

DETAILED DESCRIPTION

Figure 1:
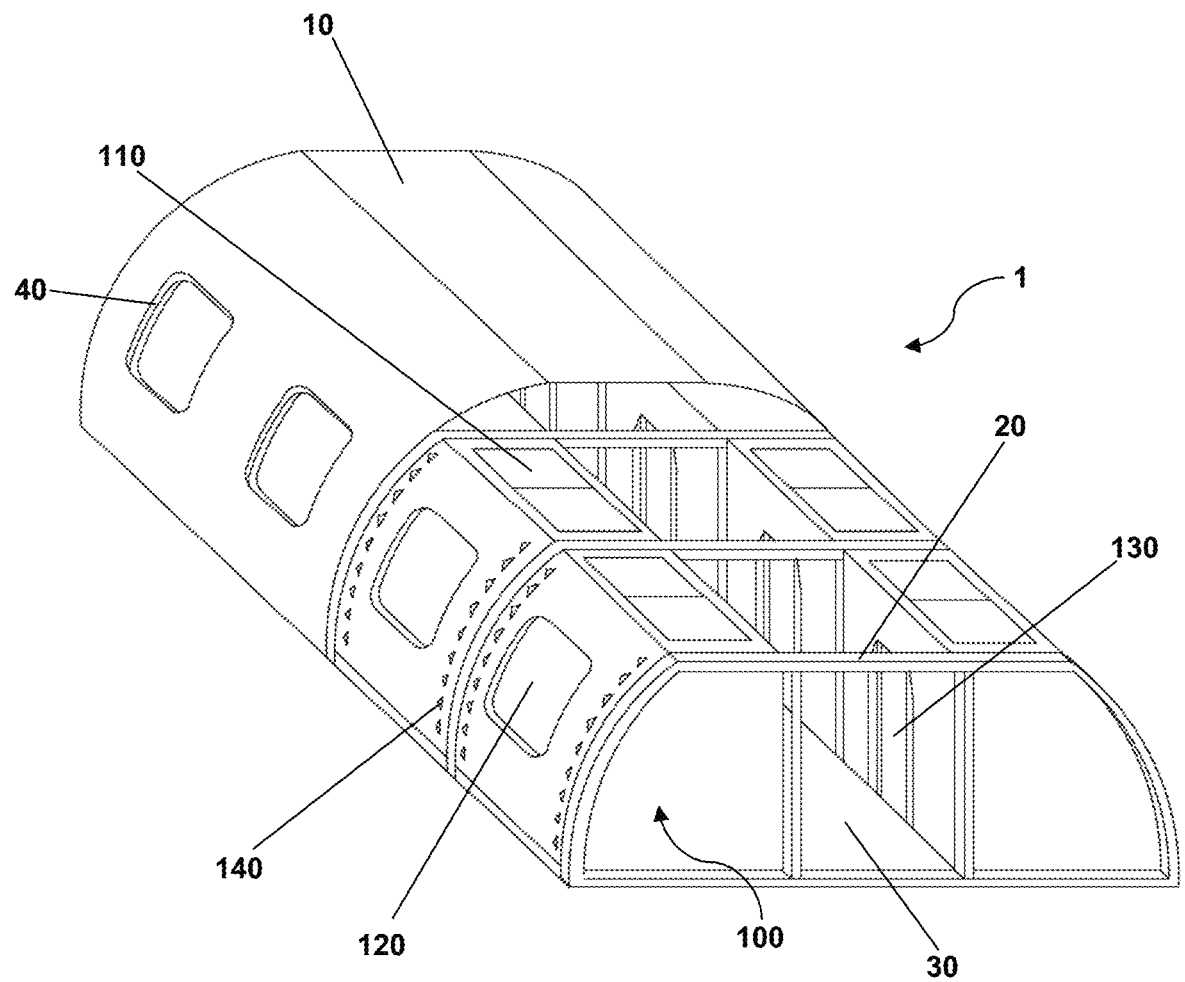
FIG. 1 shows a partial section through an aircraft cabin of an aircraft in accordance with an embodiment of this disclosure.

With reference to FIG. 1, an aircraft comprises a skin 10 disposed over a cabin frame 20, which defines the aircraft cabin 1.

The skin 10 and/or frame 20 can be made of any suitable aircraft construction material, for example, a metallic material such as an aluminium alloy or a titanium alloy, or a composite material, such as a carbon fibre composite.

A plurality of passenger modules 100 are disposed within the skin 10 in two rows, which are separated on opposing sides of the aircraft by a central aisle 30. Each passenger module 100 is separated from an adjacent module in the same row by a section of the frame 20.

The passenger modules 100 may be mounted to the cabin frame 20 and be supported by the cabin frame 20 in any suitable manner. The passenger module 100 may be detachable from the frame 20 to allow for its ejection from the aircraft as will be described further below.

In this embodiment, each passenger module 100 comprises, inter alia, a parachute compartment 110, a window 120 and a doorway 130 allowing access between the central aisle 30 and the module 100. The module 100 further comprises a plurality of cutting elements 140, such as teeth provided on an external surface thereof facing the skin 10. The cutting elements 140 in use will cut through or at least weaken the skin 10 as the module is being ejected.

The module window 120 is aligned with a window 40 in the skin 10 to allow passengers to view outside the aircraft.

The passenger module 100 is described in further detail with reference to FIGS. 2a to 2d.

Figure 2A:
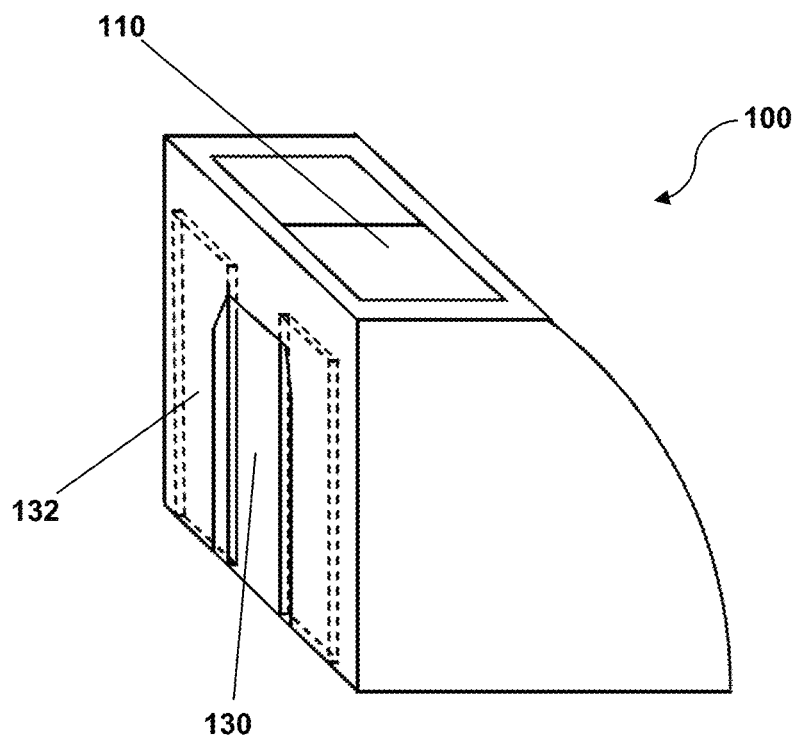
FIG. 2a shows a more detailed view of a passenger module from the aircraft cabin of FIG. 1 before ejection.
Figure 2B:
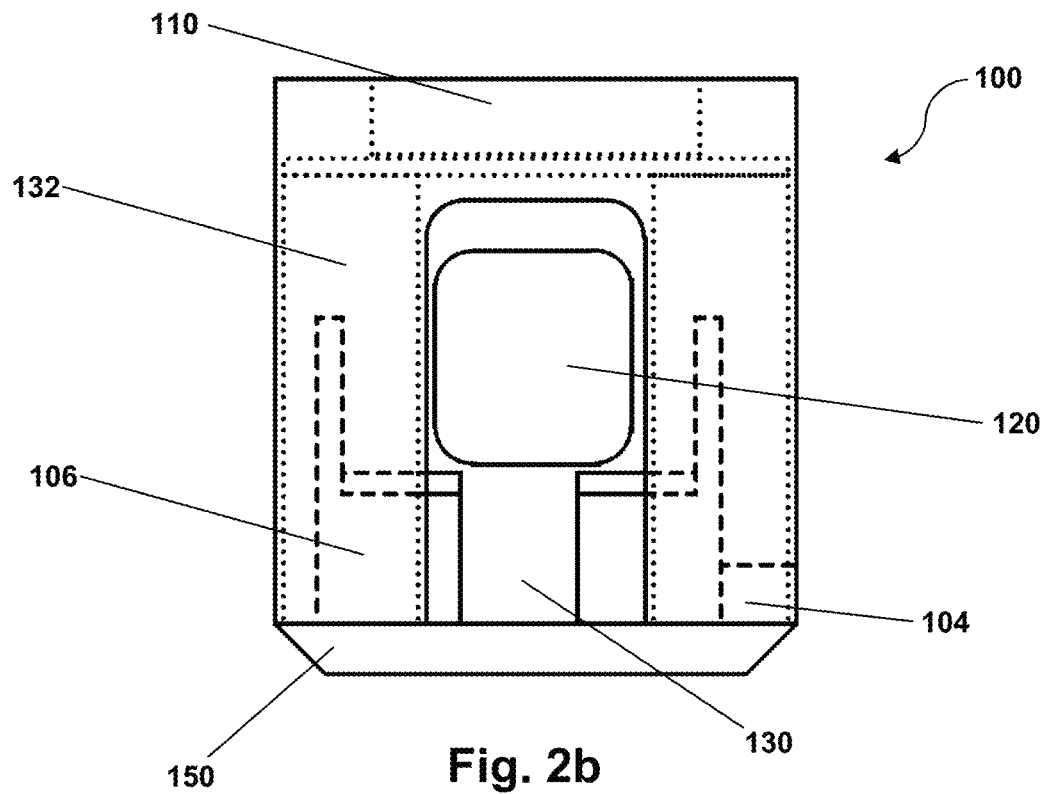
FIG. 2b shows a head-on view of the passenger module of FIG. 2a, with obstructed features shown in dashed lines.
Figure 2C:
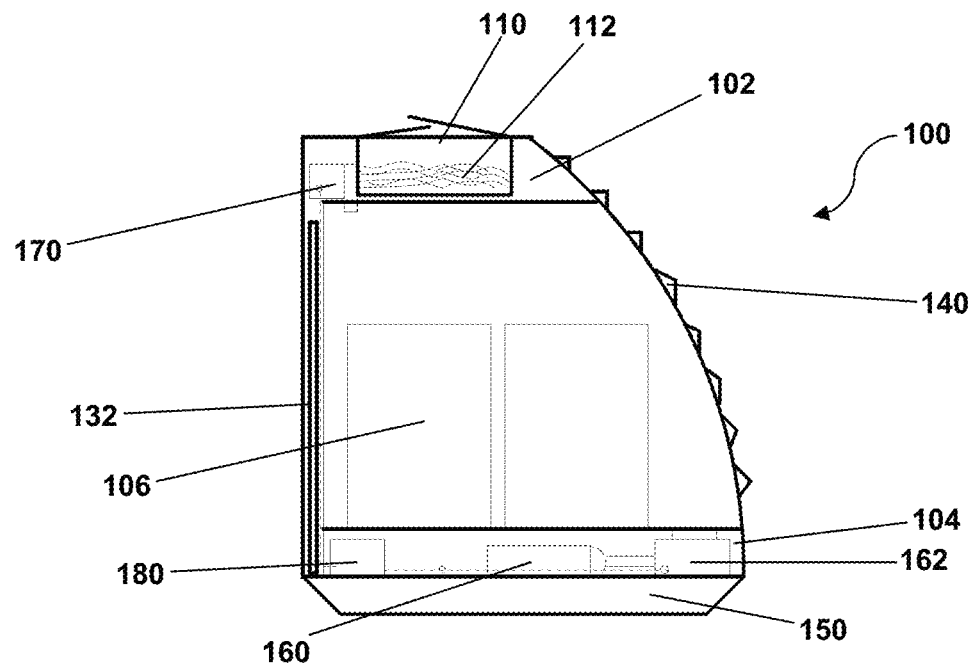
Figure 2D:
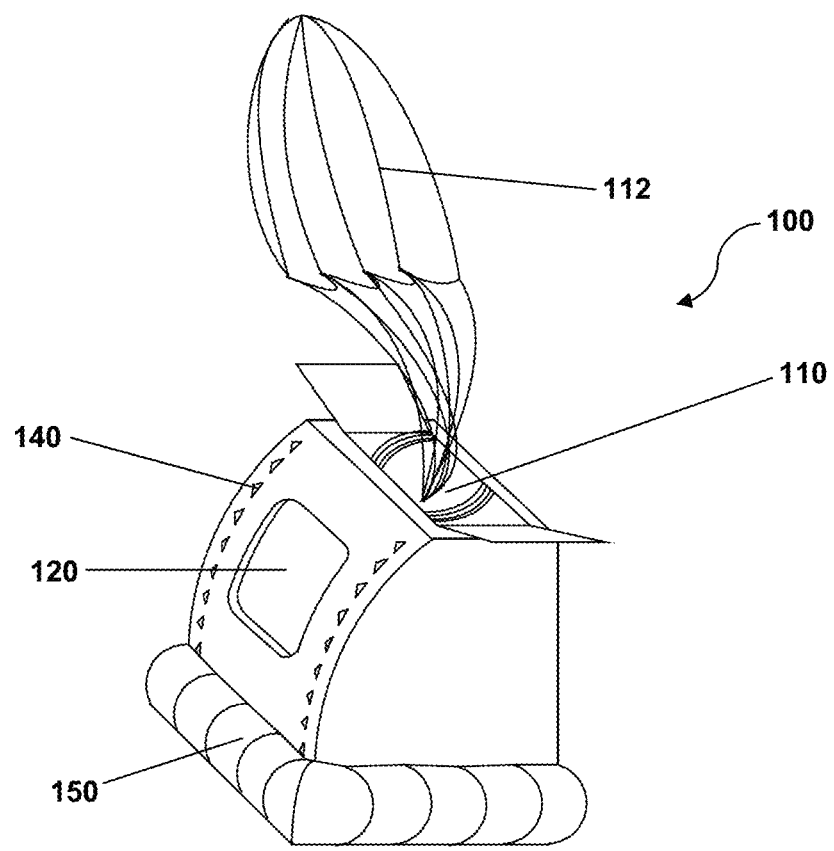
FIG. 2d shows a more detailed view of a passenger module after ejection with various survival elements deployed.

The module 100 comprises one or more seats 106 to seat one or more passengers. For example, the module 100 may comprise one or more rows of seats 106, depending on the size of the module 100. In one embodiment, the module 100 comprises just two seats arranged, for example, opposite each other as illustrated in FIG. 2b. This may be suitable as a "first class" configuration. In another embodiment, possibly more suitable for "economy class", the module may comprises four to six seats, possibly also arranged in rows, for example rows facing in the same direction.

The module 100 further comprises one or more doors 132 facing the central aisle 30 and which can be closed to prevent access to the module 100 from the central aisle 30. In the depicted embodiment, when the doors 132 are closed, the module 100 is hermetically sealed from the cabin 1. As will be appreciated by the skilled person, such sealing can be achieved with the appropriate use of seals (not shown) on the doors 132 and door frames. The doors 132 may be automatically powered closed via a command from a control system, as will be discussed in the more detail below, with reference to FIG. 5.

The module 100 also comprises survival elements which, in this embodiment, are stored in the roof 102 and in a box 104 on the floor of the module 100, and which may be deployed in response to an ejection event. The parachute compartment 110 is disposed in the roof 102 and has a parachute 112 therein which is coupled to the module 100 and which can be deployed to slow a module's descent to protect the passengers inside.

The module 100 further comprises an inflatable floor 150. When the module 100 is ejected the inflatable floor 150 can be inflated to provide cushioning for landing of the module 100 on the ground or on water, and in the event of a landing on water, provide buoyancy to prevent the module 100 from sinking. The inflatable floor 150 can be any suitable inflatable component, for example, an air bag.

The module 100 also comprises an air supply 160, for example contained within the box 104 of the module 100. The air supply 160 is in communication with a distribution unit 162 that can direct the air from the air supply 160 to the inflatable floor 150 and/or to the interior of the module 100. The air supply 160 may therefore be used to inflate the inflatable floor 150, supply oxygen to passengers inside the module 100 and/or to pressurise the module 100.

As will be discussed in more detail below with reference to FIG. 5, control and power systems for controlling and deploying/powering the survival elements are also contained within the roof 102 and within the box 104, for instance, a module sensor unit 170 and module computer unit 180. Other components (not shown), such as actuators, motors, pumps, batteries and/or fuel cells, can be arranged as necessary to operate and power/deploy the various survival elements.

Although not depicted, other survival elements can also be included in the module 100, for instance, a tracking beacon to track the position of the module for search and rescue purposes, a radio or telecommunication device to allow remote communication with the module 100, a first aid kit and food and water supplies to sustain passengers in the event of a prolonged search and rescue effort.

Figure 3A:
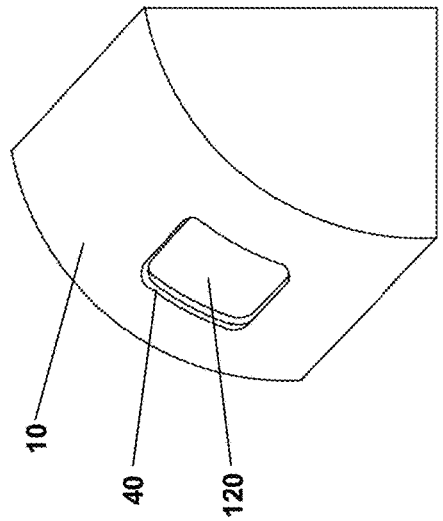
FIGS. 3a-3c show a sequence of passenger module ejection from a portion of the aircraft cabin of FIG. 1.
Figure 3B:
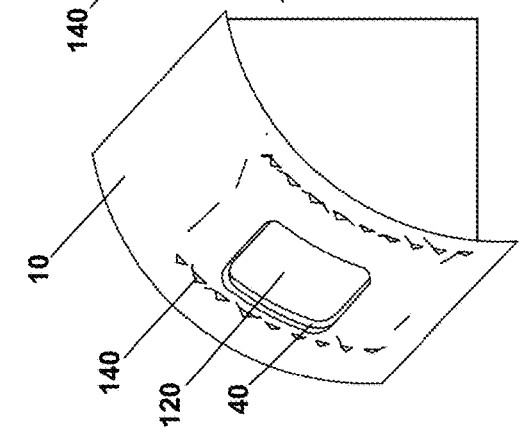
Figure 3C:
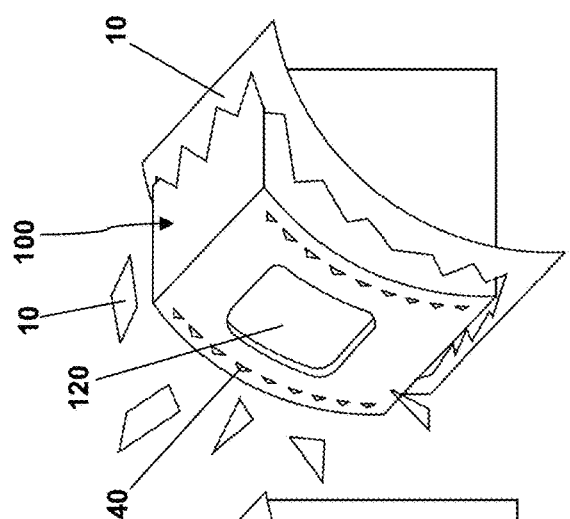
Figure 4A:
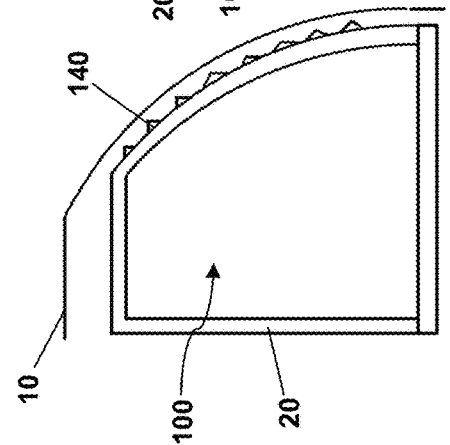
FIGS. 4a-4c show the sequence of passenger module ejection of FIGS. 3a-c in cross-section.
Figure 4B:
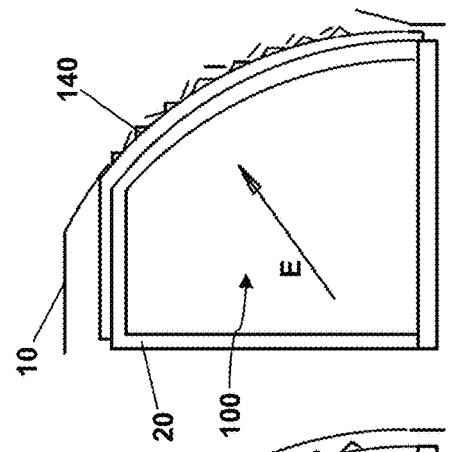
Figure 4C:
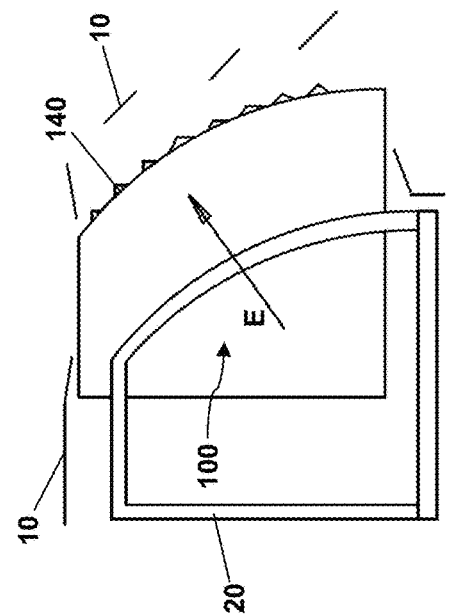

With reference to FIGS. 3a-3c and 4a-4c, an ejection sequence of the passenger module 100 is depicted. In response to an ejection command, the passenger module 100 is ejected through the skin 10 of the aircraft using an ejection force E provided by an ejector (not shown). As shown in FIGS. 3b and 4b, the ejection force E causes cutting elements 140 to pierce the skin 10 of the aircraft, thereby weakening the skin 10, and facilitating ejection of the module 100 therethrough as shown in FIGS. 3c and 4c.

The ejection force E can be provided by any suitable ejector or plurality thereof, such as rocket motors, explosive devices, hydraulic actuators and/or electric actuators, as would be appreciated by the skilled person.

Although an embodiment using cutting elements 140 is depicted, it is to be understood that these are not essential to allow the module 100 to pierce the aircraft skin 10. Thus, within the scope of the disclosure, the module 100 may omit the cutting elements 140, and rely on the momentum from the ejection force E alone to pierce through the skin 10, or the skin 10 may incorporate areas of weakness such as reduced thickness regions therein to facilitate ejection.

Figure 5:
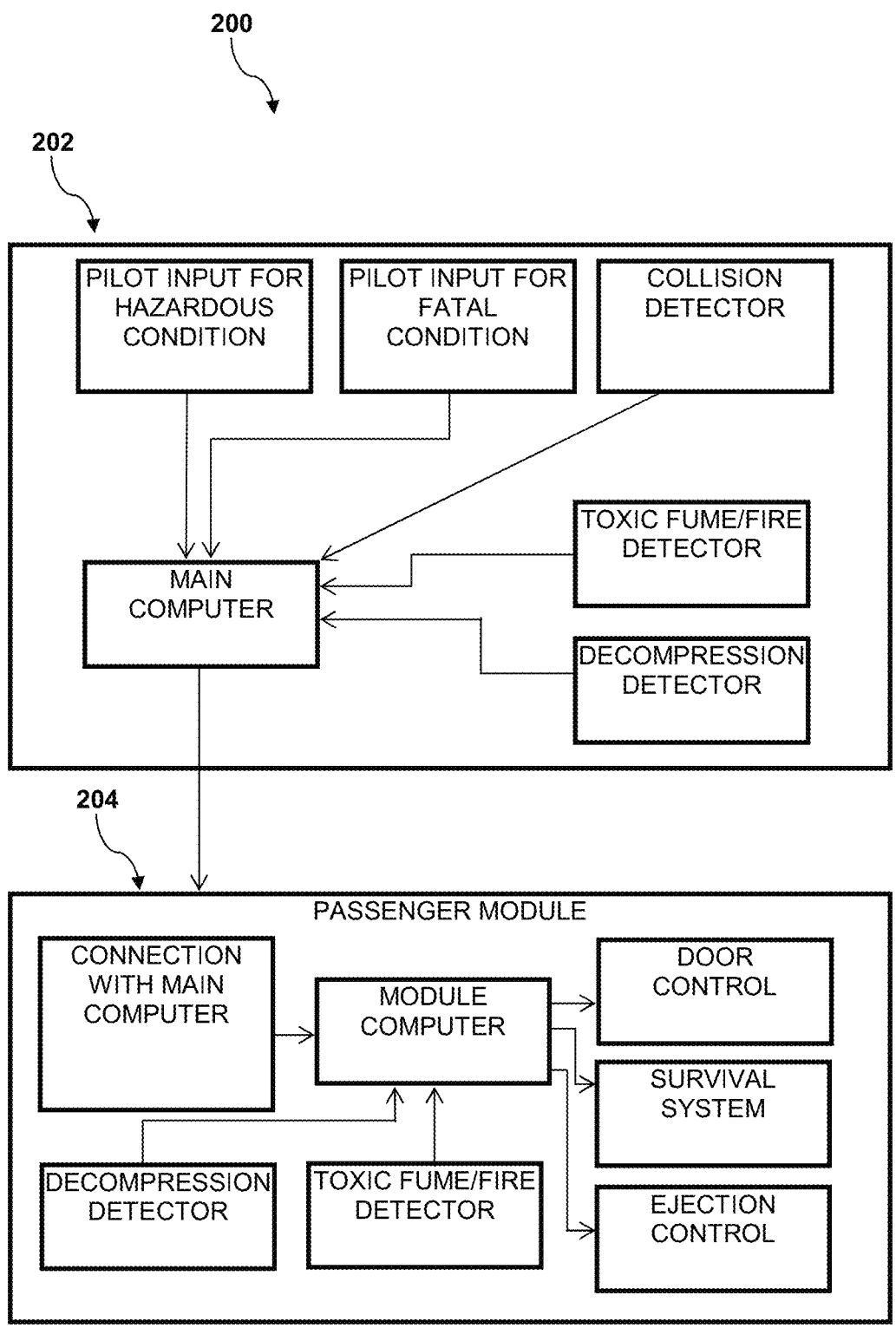
FIG. 5 shows a control system for an aircraft in accordance with an embodiment of this disclosure.

With reference to FIG. 5, an exemplary controller 200 for controlling ejection and/or sealing of the passenger module 100 is depicted.

Control system 200 features a first controller 202 that includes a main computer, two input controls, a collision detector, a toxic fume/fire detector and a decompression detector. Collision detector is coupled to the exterior of the aircraft skin 10 and the toxic fume/fire and decompression detectors are positioned within the aircraft cabin 1. In the exemplary embodiment of FIG. 5, the input controls are pilot input controls positioned in the cockpit of the aircraft, however, other or additional input controls could be provided, for instance, such that they are accessible to cabin crew outside the cockpit, or by a radio or other communication link.

The passenger module 100 features a second controller 204 that includes a module computer in electrical communication with the main computer via a connection, a decompression detector, a toxic fume/fire detector, a survival system, a module door control, and an ejection control. The decompression and toxic fume/fire detectors are positioned within the module 100.

Controllers 202, 204 are, in embodiments of the disclosure, both embedded system based electronic devices, with dedicated power sources, that run real-time operating systems (RTOS) to constantly monitor the status of signals from the detectors and monitor for commands from the input controls.

The controllers 202, 204 are configured to control ejection and/or sealing of the passenger module 100 in response to two different conditions, namely a fatal condition to the aircraft and a hazardous condition to the aircraft.

For the purposes of this disclosure, a fatal condition to the aircraft relates to a condition from which the aircraft will not be able to recover, and so ejection of passengers is deemed necessary to provide increased chances of survival. Example fatal conditions may include damage to the aircraft which prevents safe/successful flight, a collision with another aircraft or structure, a total power failure in the aircraft or a terrorist or other unauthorised person or persons having taken control of the aircraft.

For the purposes of this disclosure, a hazardous condition to the aircraft relates to a condition that is hazardous to the aircraft or its passengers, but is not fatal. In other words, although the condition is hazardous, the aircraft may still subsequently be recoverable, capable of safe flight and/or be able to land. Example hazardous conditions include a fire on board the aircraft, smoke or other toxic fumes present in the aircraft, a cabin decompression event or a terrorist threat (but without control of the aircraft being lost).

Hazardous and/or fatal conditions can be indicated automatically by the detectors of the controllers 202, 204 or by manual input. For example, the conditions may be indicated manually by a pilot (for instance, using the pilot input controls of controller 202, by cabin crew, a radio or other communication link (depending on the implementation of the input controls, as described above).

In response to a hazardous condition being indicated by either or both controllers 202, 204, the module door control can close the module doors 132 and seal the module 100 from the cabin 1. The module computer unit and module detectors can then be used to activate the appropriate survival elements for the given condition, such as those discussed with reference to FIGS. 2a-2d. For example, internal air and power supplies may be activated.

By responding to a hazardous condition in this manner, passengers can be isolated and protected from the hazardous condition, but without the need for ejection. This can prevent unnecessary loss of an aircraft and prevent passengers being put through unnecessary trauma.

However, in response to a fatal condition being indicated by either or both controllers 202, 204, the module door 132 can be sealed as above, but then the ejection control can command the ejector to eject the module 100 through the aircraft skin 10, in accordance with the procedure outlined with reference to FIGS. 3a-3c and 4a-4c.

If a hazardous condition were subsequently to develop into a fatal condition, then the ejection procedure could subsequently be initiated after the initial sealing procedure.

The embodiments described above therefore offer a system which will instigate a first safety protocol in the event of a first level of passenger threat and a second safety protocol in response to a second level of passenger threat. The first safety protocol involves the sealing of the passenger module from the rest of the aircraft, while the second safety protocol involves ejection of the passenger module from the aircraft.

The invention claimed is:
1. An aircraft comprising:
a skin surrounding a cabin of the aircraft;
a passenger module positioned within the skin; and
an ejector for ejecting the passenger module through the skin in response to an ejection command issued by a controller;
wherein the passenger module comprises at least one cutting element that penetrates the skin of the aircraft during ejection of the passenger module.

2. The aircraft of claim 1, wherein the controller is configured to issue the ejection command in response to a fatal condition to the aircraft being sensed or in response to a manual input.

3. The aircraft of claim 1, wherein the passenger module is further hermetically sealable from the cabin in response to a sealing command issued by the controller.

4. The aircraft of claim 3, wherein the controller is configured to issue the sealing command in response to a hazardous or fatal condition to the aircraft being sensed or in response to a manual input.

5. The aircraft of claim 1, wherein the passenger module further comprises at least one window, wherein, optionally, the at least one window of the passenger module is aligned with a window in the skin of the aircraft.

6. The aircraft of claim 1, wherein the aircraft further comprises a plurality of passenger modules.

7. The aircraft of claim 1, wherein
the passenger module is hermetically sealable from the cabin in response to a sealing command issued by the controller in response to a hazardous condition to the aircraft being sensed or in response to a manual input.

8. The aircraft of claim 7, wherein the ejection command is provided in response to a subsequent fatal condition to the aircraft being sensed or a subsequent manual input.

9. The aircraft of claim 7, wherein the passenger module further comprises at least one window, wherein, optionally, the at least one window of the passenger module is aligned with a window in the skin of the aircraft.

10. The aircraft of claim 7, wherein the aircraft further comprises a plurality of passenger modules.

11. The aircraft of claim 10, wherein the cabin further comprises a central aisle and a pair of passenger modules are positioned on opposing sides of the central aisle and are spaced apart thereby.

12. A method of protecting a passenger on an aircraft comprising:
providing a passenger module within a cabin of the aircraft, the passenger module including at least one cutting element; and
ejecting the module through a skin of the aircraft in a fatal condition to the aircraft, wherein ejecting includes penetrating the skin with the at least one cutting element.

13. The method of claim 12, wherein the fatal condition to the aircraft is sensed or in response to a manual input.

14. The method of claim 12, further comprising sealing the passenger module from the cabin in a hazardous condition to the aircraft.

* * * * *